(12) United States Patent
Nakabeppu et al.

(10) Patent No.: US 7,374,822 B2
(45) Date of Patent: May 20, 2008

(54) NEAR-INFRARED RAY-SHIELDING PAINT, NEAR-INFRARED RAY-SHIELDING LAMINATE OBTAINED THEREFROM AND PRODUCTION METHOD THEREOF

(75) Inventors: Tetsuya Nakabeppu, Tokyo (JP); Tsutomu Tamura, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 211 days.

(21) Appl. No.: 10/576,327

(22) PCT Filed: Oct. 19, 2004

(86) PCT No.: PCT/JP2004/015760

§ 371 (c)(1), (2), (4) Date: Apr. 19, 2006

(87) PCT Pub. No.: WO2005/037940

PCT Pub. Date: Apr. 28, 2005

(65) Prior Publication Data
US 2007/0123614 A1 May 31, 2007

(30) Foreign Application Priority Data
Oct. 20, 2003 (JP) ............................. 2003-359182

(51) Int. Cl.
B32B 27/08 (2006.01)
B32B 27/18 (2006.01)
B32B 27/20 (2006.01)
B32B 27/30 (2006.01)
B32B 27/36 (2006.01)

(52) U.S. Cl. ................ 428/483; 428/212; 428/480; 428/523; 427/372.2; 427/384; 427/393.5; 359/350; 359/361; 359/359; 558/418; 558/419; 252/582; 252/583; 252/587; 252/588; 252/589

(58) Field of Classification Search ............... None
See application file for complete search history.

(56) References Cited

U.S. PATENT DOCUMENTS

| 3,575,871 | A * | 4/1971 | Susi et al. ................ 252/587 |
| 4,656,121 | A * | 4/1987 | Sato et al. ............. 430/270.19 |
| 5,108,873 | A * | 4/1992 | Fukui et al. ........... 430/270.19 |
| 6,207,266 | B1 * | 3/2001 | Kanbara et al. ............ 428/323 |
| 6,210,787 | B1 * | 4/2001 | Goto et al. .............. 428/301.4 |
| 6,475,590 | B1 * | 11/2002 | Kitayama et al. .......... 428/64.8 |
| 6,746,629 | B2 * | 6/2004 | Ozawa et al. .............. 252/589 |
| 6,775,059 | B2 * | 8/2004 | Kuwabara .................... 359/359 |
| 6,777,087 | B2 * | 8/2004 | Marutsuka ................ 428/411.1 |
| 6,879,438 | B2 * | 4/2005 | Masuda ....................... 359/359 |
| 6,902,791 | B2 * | 6/2005 | Kawasato et al. .......... 428/141 |
| 6,960,387 | B2 * | 11/2005 | Suzuki et al. ............... 428/336 |
| 7,005,176 | B2 * | 2/2006 | Tojo et al. .................. 428/141 |
| 2002/0046851 | A1 * | 4/2002 | Marutsuka ............. 174/35 MS |
| 2004/0204555 | A1 * | 10/2004 | Noda et al. ................. 526/242 |

FOREIGN PATENT DOCUMENTS

| GB | 1069951 | * | 4/1967 |
| JP | 43-25335 B | | 11/1968 |
| JP | 04-174403 | * | 6/1992 |
| JP | 2001-133624 | * | 5/2001 |
| JP | 2001-133624 A | | 5/2001 |
| JP | 2002-138203 A | | 5/2002 |
| JP | 2002-156521 | * | 5/2002 |
| JP | 2002-156521 A | | 5/2002 |
| JP | 2002-249721 | * | 9/2002 |
| JP | 2002-249721 A | | 9/2002 |
| JP | 2002-301785 | * | 10/2002 |
| JP | 2002-301785 A | | 10/2002 |
| JP | 2004-12592 A | | 1/2004 |
| JP | 2004-161792 A | | 6/2004 |
| WO | WO 2004/048480 | | 6/2004 |

* cited by examiner

Primary Examiner—Vivian Chen
(74) Attorney, Agent, or Firm—Paul & Paul

(57) ABSTRACT

A near-infrared ray shielding paint capable of forming a coating that exhibits high light transmission coefficient in visible light region while having high shielding capability in near-infrared region and exhibits little chromaticity change even in harsh environment, which near-infrared ray shielding paint comprises a first near-infrared ray-absorption coloring matter containing a compound composed of a diimonium compound cation and an anion of the formula (1), a second near-infrared ray-absorbing coloring matter of different type and a transparent resin in which a compound of the formula (2) is polymerized in an amount of 30% by mass or more. A near-infrared ray shielding laminate having a near-infrared ray shielding layer is produced with the use of this paint.

$(CF_3SO_2)_2N^-$ (1)

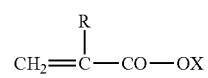

(2)

[R is H or a —$CH_3$ group, and X is a $C_6$-$C_{25}$ cyclohydrocarbon group].

16 Claims, No Drawings

NEAR-INFRARED RAY-SHIELDING PAINT, NEAR-INFRARED RAY-SHIELDING LAMINATE OBTAINED THEREFROM AND PRODUCTION METHOD THEREOF

TECHNICAL FIELD

The present invention relates to a near-infrared ray-shielding paint, a near-infrared ray-shielding laminate and a production method thereof. More specifically, the present invention relates to a paint for forming a stable near-infrared ray-shielding layer having a high transmittance in the visible region and a high near-infrared ray-shielding property in the region of 850 to 1,000 nm and ensuring less chromaticity change upon exposure to outside light for a long time, and also relates to a near-infrared ray-shielding laminate obtained by using the paint, and to a production method thereof.

BACKGROUND ART

A material obtained by coating a resin composition containing a near-infrared ray-absorption coloring matter on a transparent substrate to absorb and thereby shield light in the near-infrared region is known as a near-infrared ray-shielding material assured of a high visible light transmittance and a high near-infrared ray-shielding property in the near-infrared region.

As for the near-infrared ray-absorption coloring matter, various combinations of a diimmonium-based compound, an aminium-based compound, a phthalocyanine-based compound, an organic metal complex-based compound and the like have been proposed.

With respect to the resin material used for forming the paint film, use of various thermoplastic resins such as polyester-based resin, acrylic resin, polyurethane-based resin, polyolefin-based resin and polycarbonate-based resin is known.

However, when the above-described near-infrared ray-absorption coloring matter is used alone for obtaining a high near-infrared ray-shielding property in the region of 850 to 1,000 nm, the transmittance in the visible region decreases. Therefore, at least two coloring matters must be mixed and used. Furthermore, for achieving both a high visible light transmittance and a high near-infrared ray-shielding property in the region of 850 to 1,000 nm, out of those near-infrared ray-absorption coloring matters, it is essential to contain at least a diimmonium-based compound represented by formula (5) having small absorption in the visible region and a large absorption coefficient in the near-infrared region.

The diimmonium-based compound conventionally used for the near-infrared ray-shielding resin composition is, for example, a compound represented by the following formula (5) disclosed in Japanese Examined Patent Publication (Kokoku) No. 43-25335 (Patent Document 1), wherein R represents, for example, an alkyl group such as methyl group, ethyl group, propyl group and butyl group, an aryl group or a hydroxy group, and X represents, for example, a perchlorate ion, a fluoroborate ion, a hexafluoroarsenate ion or a hexafluoroantimonate ion. Specific examples of the compound represented by formula (5) which has been heretofore used include a salt of N,N,N',N'-tetrakis(p-diethylbutylaminophenyl)-p-phenylenediamine-bis(immonium).

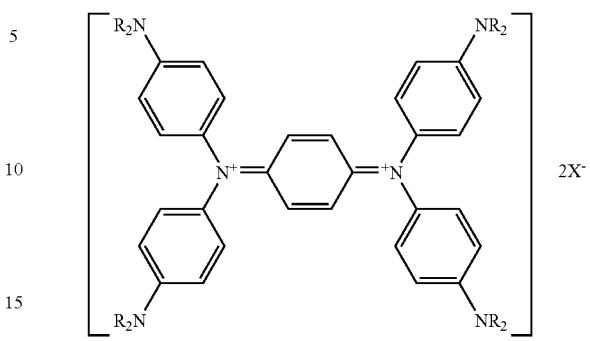

Among these salts, in producing a near-infrared ray-shielding laminate, a hexafluoroantimonate of N,N,N',N'-tetrakis(p-diethylbutylaminophenyl)-p-phenylenediamine-bis(immonium), which exhibits relatively stable weather resistance, has been suitably used.

Such a diimmonium compound has strong absorptivity with a molar extinction coefficient of about 100,000 in the near-infrared region at a wavelength of 850 to 1,100 nm and slight absorption in the visible region at a wavelength of 400 to 500 nm and therefore, provides a yellow-brown transmitted color but, by virtue of its excellent visible light transparency as compared with other near-infrared ray-absorption coloring matters, this compound is an essential component for the near-infrared ray-shielding composition of this embodiment where a high transmittance in the visible region is to be obtained.

However, when the near-infrared ray-shielding layer obtained by mixing such a diimmonium compound and a resin material and coating the resulting resin composition on a transparent substrate is left standing for a long time in a high-temperature high-humidity atmosphere, particularly in a severe environment such as 80° C.-relative humidity 95% atmosphere simulating marine transportation of the product, the diimmonium compound inevitably undergoes alteration, in view of composition, to cause a problem that the variation of chromaticity x and y increases. Thus, improvement of durability is demanded.

As for the paint film exhibiting relatively stable durability when left standing in a high-temperature high-humidity condition for a long time, a near-infrared ray-shielding material obtained by coating a resin composition using a polyester-based or polycarbonate-based resin having a high glass transition point on a transparent substrate is known but, generally, such a resin material having a high glass transition point is sparingly soluble in a solvent and at the time of preparing the resin composition, a solvent having high toxicity and allowing for very rapid drying, such as dichloromethane and chloroform, needs to be used, giving rise to a problem in the stability as the resin composition, for example, film formation is difficult due to easy occurrence of brushing during coating or because the paint itself is readily gelled. Furthermore, despite good long-term stability in a high-temperature high-humidity condition, there is a problem that the variation of chromaticity x and y, between before and after a xenon accelerated weather resistance test for 48 hours, becomes significantly large.

Patent Document 1: Kokoku No. 43-25335, page 13

DISCLOSURE OF THE INVENTION

The present invention has been made by taking account of those problems in conventional techniques and an object of the present invention is to provide a paint excellent in the storage stability and coating stability and capable of forming a near-infrared ray-shielding layer which is assured of both a high transmittance in the visible ray region and a high near-infrared ray-shielding property in the region of 850 to 1,000 nm and chemically stable with less chromaticity change upon exposure to outside light for a long time, for example, such that when an accelerated deterioration test is performed for 1,000 hours in a high-humidity atmosphere at a temperature of 60° C. and a relative humidity of 90%, in a high-temperature dry atmosphere at 80° C. and a relative humidity of 5% or less or in a high-temperature high-humidity atmosphere at 80° C. and a relative humidity of 95% or when an accelerated weather resistance test is performed for 48 hours under irradiation of a xenon lamp at a radiation intensity of 550 W/m$^2$, the variation of the chromaticity x and y between before and after the test is 0.005 or less; a near-infrared ray-shielding laminate using the paint, such as optical filter for a plasma display or near-infrared ray-shielding filter of an optical product; and a method for producing the same.

The above-mentioned object can be attained by the near-infrared ray shielding paint, the near-infrared ray shielding laminate obtained therefrom and the method of producing the same of the present invention.

The near-infrared ray shielding paint of the present invention comprises a first near-infrared ray-absorption coloring matter comprising at least one near-infrared ray-absorption diimonium compound constituted from a diimonium compound cation and a counter anion represented by the formula (1):

$$(CF_3SO_2)_2N^- \tag{1}$$

a second near-infrared ray-absorption coloring matter comprising at least one coloring matter compound having a maximum absorption in a near-infrared wavelength range of from 750 to 950 nm, exhibiting substantially no absorption in the visible ray wavelength range and different from the diimonium compound; and a transparent resin comprising a polymer of at least one ethylenically unsaturated monomer;

wherein the ethylenically unsaturated monomer comprises a monomer represented by the general formula (2):

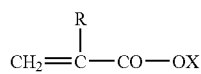

(2)

in which general formula (2), R represents a hydrogen atom or a methyl group and X represents a cyclic hydrocarbon group having 6 to 25 carbon atoms, in a content of 30% by mass.

In the near-infrared ray shielding paint of the present invention, the near-infrared ray-absorption diimonium compound for the first near-infrared ray-absorption coloring matter preferably comprises a compound represented by the formula (3):

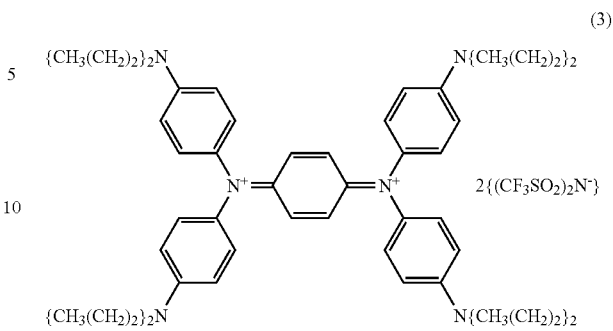

In the near-infrared ray shielding paint of the present invention, the second near-infrared ray-absorption coloring matter is preferably selected from dithiol metal complex compounds, phthalocyanine compounds, naphthalocyanine compounds and cyanine compounds each having a maximum absorption in the wavelength range of from 750 to 950 nm and exhibiting substantially no absorption in the visible ray wavelength range.

In the near-infrared ray shielding paint of the present invention, the phthalocyanine compound is preferably selected from the compounds represented by the general formula (4):

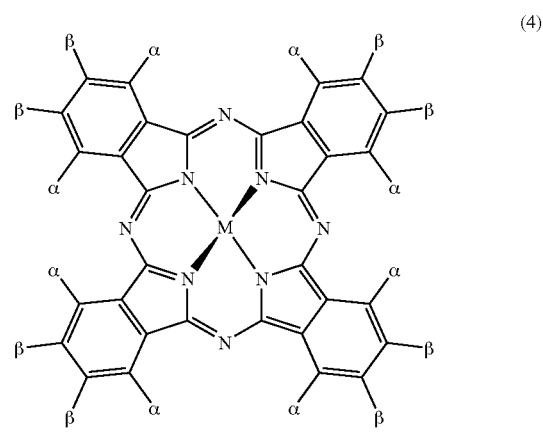

in which general formula (4), the eight αs respectively and independently represents a member selected from —SR$^1$, —OR$^2$ and —NHR$^3$ groups and a halogen atom, except that at least one of the αs must represent the NHR$^3$ group; the eight βs respectively or independently from each other represent a member selected from —SR$^1$ or —OR$^2$ groups and a halogen atom, except that at least one of the βs must represent a —SR$^1$ or —OR$^2$ group; and at least one of the eight αs and at least one of the eight βs respectively represents a halogen atom and an —OR$^2$ group, R$^1$, R$^2$ and R$^3$ respectively and independently from each other represents a member selected from substituted and unsubstituted phenyl groups, alkyl groups having 1 to 20 carbon atoms and aralkyl groups having 7 to 20 carbon atoms, and M represent a member selected from a metal atom, one or more hydrogen atoms, a metal oxide and a metal halide.

In the near-infrared ray shielding paint of the present invention, the ratio in mass of the first near-infrared ray absorption coloring matter to the second near-infrared ray absorption coloring matter contained in the paint is preferably in the range of from 3:2 to 29:1.

In the near-infrared ray shielding paint of the present invention, ratios in absorptivity of the second near-infrared absorption coloring matter at the maximum absorption wavelength in the near-infrared ray wavelength range to absorptivities of the second near-infrared absorption coloring matter at the wavelengths of 450 nm, 550 nm and 620 nm are preferably all 5.0 or more.

In the near-infrared ray shielding paint of the present invention, the transparent resin preferably has a glass-transition temperature of 60 to 120° C., a number average molecular weight of 20,000 to 80,000 and a weight average molecular weight of 200,000 to 400,000.

In the near-infrared ray shielding paint of the present invention, a ratio in dry solid mass of the total of the first and second near-infrared ray-absorption coloring matter to the transparent resin is preferably in the range of from 1:99 to 1:4.

The near-infrared ray shielding laminate of the present invention comprises a substrate material and at least one near-infrared ray-shielding layer formed from the barrier paint for shielding the near-infrared rays as mentioned above, and bonded to at least one surface of the substrate material.

In the near-infrared ray shielding laminate of the present invention, the substrate material preferably comprises a polyester resin film and an adhesion-enhancing layer formed on a surface of the polyester resin film but not containing a reactive curing agent, the near-infrared ray-shielding layer being formed on the adhesion-enhancing layer.

The near-infrared ray shielding laminate of the present invention, preferably has a visible ray-transmittance of 60% or more at each wavelength of 450 nm, 525 nm and 620 nm and an average near-infrared ray transmittance of 10% or less at a wavelengths from 850 to 1,000 nm.

In the near-infrared ray shielding laminate of the present invention, the visible ray transmittance of the laminate at a wavelength of 590 nm is preferably 10% or more below the visible ray transmittance of the laminate at each wavelength of 450 nm, 525 nm and 620 nm.

In the near-infrared ray shielding laminate of the present invention, preferably, the substrate material has a ultraviolet ray-shielding property, and/or a ultraviolet ray-shielding layer is further coated on the near-infrared ray-shielding layer, and as a whole the barrier laminate exhibits a ultraviolet ray transmittance of 2% or less, in the ultraviolet range and at a wavelength of 380 nm or less.

In the near-infrared ray shielding laminate of the present invention, the ultraviolet ray shielding layer preferably comprises a transparent solid material and a ultraviolet ray-absorption layer formed on a surface of the transparent solid material and comprising a ultraviolet absorber and a binder.

In the near-infrared ray shielding laminate of the present invention, in a result of each deterioration promotion test in a high humidity atmosphere at a temperature of 60° C. at a relative humidity of 90% for 1,000 hours; a deterioration promotion test in a high temperature dry atmosphere at a temperature of 80° C. at a relative humidity of 5% or less for 1,000 hours; a deterioration promotion test in a high temperature high humidity atmosphere at a temperature of 80° C. at a relative humidity of 95% for 48 hours; and a deterioration promotion weathering test under a xenon lamp irradiation at an intensity of radiation of 550 W/m² for 48 hours, the changes in chromaticities x and y of the laminate for shielding near-infrared rays between before and after the each test is preferably 0.005 or less.

The method of the present invention for producing a near-infrared ray shielding laminate comprises coating the barrier paint for infrared rays as mentioned above on at least one surface of a substrate material and drying the resultant coating layer to form a near-infrared ray-shielding layer.

The near-infrared ray shielding paint can form a coating layer having a high transmittance in the visible ray region and a high shielding effect in the near-infrared ray region and is capable of exhibiting a high solubility even under severe conditions, and allows a laminate having the above-mentioned coating layer, and a method of producing the same, to be provided.

BEST MODE FOR CARRYING OUT THE INVENTION

As a result of intensive investigations to solve those problems, the present inventors have found that the alteration mechanism of the diimmonium compound represented by formula (5) in a high-temperature high-humidity atmosphere is attributable to the decomposition of the counter anion in the diimmonium compound caused by the mediation of water in the resin composition paint film as well as by the effect of heat energy resulting from heating and further found that a near-infrared ray-shielding film comprising a first near-infrared ray-absorption coloring matter comprising a diimmonium-based cationic compound having a specific counter-anion represented by chemical formula (1), a second infrared ray-absorption coloring matter differing from the first near-infrared ray-absorption coloring matter, having absorption maximum in the near-infrared region and exhibiting substantially no absorption in the visible region, and a transparent resin obtained by using a specific monomer component represented by formula (2) can form a near-infrared ray-shielding layer reduced in a change of the chromaticity in a high-temperature high-humidity atmosphere as well as upon exposure to outside light for a long time and assured of both a high transmittance in the visible region and a high near-infrared ray-shielding property in the region of 850 to 1,000 nm.

The near-infrared ray-shielding laminate of the present invention can be produced according to the production method of the present invention by coating the near-infrared ray-shielding paint of the present invention on a substrate material, and drying and solidifying the coating. The near-infrared ray-shielding paint of the present invention comprises a first near-infrared ray-absorption coloring matter comprising at least one near-infrared ray-absorbing diimmonium-based compound comprising a diimmonium compound cation and a counter anion represented by chemical formula (1), a second near-infrared ray-absorption coloring matter comprising at least one coloring matter compound having absorption maximum in the near-infrared wavelength region of 750 to 950 nm, exhibiting substantially no absorption in the visible wavelength region and differing from the above-described diimmonium-based compound, and a transparent resin comprising a polymer of at least one ethylenically unsaturated monomer, wherein the at least one ethylenically unsaturated monomer comprises a monomer represented by formula (2) in a content of at least 30 mass %. In formula (2), the $C_6$-$C_{25}$ cyclic hydrocarbon group represented by X includes an alicyclic $C_6$-$C_{25}$ cyclic hydrocarbon group and an aromatic $C_6$-$C_{25}$ cyclic hydrocarbon group.

A compound comprising a counter anion of chemical formula (1) and a diimmonium compound cation is used as the first near-infrared ray-absorption coloring matter. The diimmonium-based cationic compound has a specific counter anion represented by chemical formula (1) and when the compound is contained in the near-infrared ray-shielding layer, the counter anion in the diimmonium compound undergoes less decomposition which may be caused by the mediation of water as well as by the effect of heat energy resulting from heating, so that alteration in view of composition can be suppressed.

In the near-infrared ray-shielding film formed by using the near-infrared ray-shielding paint, for bringing out a sufficiently high near-infrared ray-shielding property in practice, the average transmittance at a wavelength of 850 to 900 nm must be controlled to be 20% or less. If only the above-described diimmonium-based compound is contained in the near-infrared ray-shielding film, a sufficiently high near-infrared ray-shielding property cannot be obtained in the wavelength region described above. Also, if the first near-infrared ray-absorption coloring matter is excessively contained so as to elevate the near-infrared ray-shielding property, the variation of the chromaticity x and y between before and after each test becomes large and this is not preferred.

Therefore, in the paint of the present invention, a second near-infrared ray-absorption coloring matter having absorption maximum in the wavelength region of 750 to 950 nm and having substantially no absorption in the visible region is added. By virtue of containing the first near-infrared ray-absorption coloring matter and the second near-infrared ray-absorption coloring matter, a paint film having excellent near-infrared ray-shielding property in the near-infrared region of 850 to 1,000 nm and having excellent transparency in the visible light portion can be formed.

The second near-infrared ray-absorption coloring matter for use in the present invention preferably provides ratios of the absorption coefficient at the absorption maximum wavelength to the absorption coefficient at respective wavelengths of 450 nm (center wavelength of blue light), 525 nm (center wavelength of green light) and 620 nm (center wavelength of red light) that are preferably 5.0 or more, more preferably 8.0 or more. If any one ratio of the absorption coefficients is less than 5.0, when the average transmittance at a wavelength of 850 to 900 nm is 20% or less, any one visible light transmittance at wavelengths of 450 nm (center wavelength of blue light), 525 nm (center wavelength of green light) and 620 nm (center wavelength of red light) becomes less than 60% and insufficient transmittance in the visible region results.

Examples of the second near-infrared ray-absorption coloring matter for use in the present invention include a dithiol metal complex-based compound, a phthalocyanine-based compound, a naphthalocyanine-based compound and a cyanine-based compound. Among these, a phthalocyanine-based compound is suitably used because of its excellent solubility in an organic solvent.

In recent years, a large number of phthalocyanine-based compounds rendered to have absorption maximum in the near-infrared region by introducing a conjugated π electron-based substituent (e.g., phenyl group) or many electron-donating groups (e.g., alkoxy group) into the phthalocyanine skeleton have been proposed. Among these, a phthalocyanine-based compound represented by formula (4) can be suitably used, because the above-described ratios of the absorption coefficient each becomes 5.0 or more.

Two or more kinds of near-infrared ray-absorption coloring matters may be used for each of the first near-infrared ray-absorption coloring matter and the second near-infrared ray-absorption coloring matter, and other coloring matters may be further added, if desired.

The blending ratio by mass of the first near-infrared ray-absorption coloring matter and the second near-infrared ray-absorption coloring matter is preferably from 3:2 to 29:1, more preferably from 2:1 to 9:1. If this blending ratio is less than 3/2, an insufficient transmittance of ray in the visible region may result, whereas if it exceeds 29/1, the variation of chromaticity between before and after various reliability tests may be increased.

The transparent resin for use in the near-infrared ray-shielding paint of the present invention comprises at least one polymer of at least one ethylenically unsaturated monomer, and the monomer of formula (2) occupies at least 30 mass %, preferably from 50 to 100 mass %, of the at least one ethylenically unsaturated monomer forming the polymer. The transparent resin having such a constitution exhibits high solubility in various organic solvents (e.g., toluene, xylene, ethyl acetate, butyl acetate, acetone, methyl ethyl ketone, methyl isobutyl ketone, cyclohexane, tetrahydrofuran) and at the same time, can form a paint film having high moisture resistance and high ultraviolet resistance. In the monomer represented by formula (2), the $C_6$-$C_{25}$ cyclic hydrocarbon group represented by X is preferably, for example, a cyclohexyl group, a methylcyclohexyl group, a cyclododecyl group, a bornyl group or an isobornyl group.

The transparent resin obtained by polymerizing a monomer component containing a monomer represented by formula (2) in an amount of 30 wt % or more is preferably a methacrylate-based resin having a $C_6$-$C_{25}$ cyclic hydrocarbon group (=X). In the case of a thermoplastic paint film formed from a paint prepared by dispersing the first and second near-infrared ray-absorption coloring matters in other general methacrylate-based resin such as methyl methacrylate resin, when the paint film is exposed for a long time under a high-temperature high-humidity condition, deterioration of the resin paint film occurs by the effect of water in the environment and this brings about alteration of the first near-infrared ray-absorption coloring matter, giving rise to a problem that the chromaticity of the paint film is greatly changed. On the other hand, when a polymer containing the monomer represented by formula (2) as an essential polymerization component is used as the transparent resin, the durability of the first near-infrared ray-absorption coloring matter in a high-temperature high-humidity condition is enhanced and in addition, the durability against ultraviolet irradiation can also be enhanced.

The transparent resin for use in the present invention is preferably a thermoplastic methacrylate-based resin. If another thermosetting resin, ultraviolet-curable resin or electron beam-curable resin is used, the reactive group contained in the resin readily reacts with the diimmonium-based compound for the first near-infrared ray-absorption coloring matter, and degeneration of the coloring matter may occur in the resin composition or in the process of forming a paint film.

The content of the monomer represented by formula (2) is 30 mass % or more based on the total mass of all monomers used for the formation of polymer. If this content is less than 30%, the paint film cannot be satisfactorily prevented from the chromaticity change due to alteration of the diimmonium-based compound for the first near-infrared ray-absorption coloring matter. The content of the monomer represented by formula (2) is preferably 50 mass % or more, more preferably from 80 to 100 mass %.

The thermoplastic methacrylate-based resin containing the monomer represented by formula (2) as an essential polymerization component can be easily synthesized by solution polymerization in a general-purpose organic solvent such as toluene, ethyl acetate, butyl acetate and methyl ethyl ketone. Also, the diimmonium-based compound for the first near-infrared ray-absorption coloring matter and the transparent resin itself in the paint each has sufficiently high solubility and therefore, a resin composition stable as a paint can be obtained.

The transparent resin obtained by polymerizing a monomer polymerization component containing 30 mass % or more of the monomer represented by formula (2) preferably has a glass transition point of 60 to 120° C., more preferably from 80 to 100° C. If the glass transition point is less than 60° C., when the paint film is exposed to a high temperature of 80° C. or more for a long time, the resin is softened and, at the same time, the diimmonium-based compound for the first near-infrared ray-absorption coloring matter in the paint film readily undergoes alteration to cause great change in the chromaticity of the paint film or reduction in the near-infrared ray-shielding property of the paint film, giving rise to adverse effect on the long-term heat resistance. However, when the glass transition point is 60° C. or more, the first and second near-infrared ray-absorption coloring matters, particularly, the diimmonium-based compound, can be prevented from alteration due to heat. On the other hand, if the glass transition temperature exceeds 120° C., the paint film formed is hard and brittle and there may arise a problem, in practice, such as a reduction in the flex resistance or an easy generation of cracks by handling or the like.

The transparent resin for use in the present invention is preferably a thermoplastic methacrylate-based resin having a glass transition point of 60 to 120° C.

As for the molecular weight of the transparent resin used in the present invention, it is preferred that the number average molecular weight is from 20,000 to 80,000 and the weight average molecular weight is from 200,000 to 400,000. Incidentally, the number average molecular weight and the weight average molecular weight are each measured values obtained by GPC using a polystyrene standard. If the weight average molecular weight is less than 200,000, the formed near-infrared ray-shielding paint film may have insufficient flexibility and in turn low flex resistance and may also be poor in the chemical resistance, whereas if the weight average molecular weight exceeds 400,000, the solution polymerization of the polymer itself can be hardly performed. On the other hand, if the number average molecular weight is less than 20,000 or exceeds 80,000, insufficient chemical resistance may result.

In the case where adhesion to the polyester-based resin film, as a substrate material on which the paint is coated, must be imparted, the transparent resin for use in the present invention preferably has an appropriate acid value originated in the monomer containing a carboxyl group. This acid value is preferably from 1 to 20 mgKOH based on the solid content of the resin. If the acid value is less than 1 mgKOH, a sufficiently high adhesion of the paint film to the substrate material may not be obtained, whereas if it exceeds 20 mgKOH, this may adversely affect the stability of the diimmonium-based compound for the first near-infrared ray-absorption coloring matter in a high-temperature condition.

In the paint of the present invention, the ratio of the total mass of the first and second near-infrared ray-absorption coloring matters to the mass of the transparent resin is, in terms of the dry solid content, preferably from 1:99 to 1:4, more preferably from 1:49 to 1:24. If this mass ratio is less than 1/99, the near-infrared ray-shielding layer must be formed to a dry thickness as large as 20 μm or more so as to obtain a high near-infrared ray-shielding ratio but such a thick film is difficult to form, whereas if it exceeds 1/4, there may arise a problem such as a reduction in the shielding performance and an increase in the haze value due to segregation of the infrared ray-absorption coloring matter in the process of forming the near-infrared ray-shielding paint film.

The near-infrared ray-shielding laminate of the present invention is formed from a substrate material and the near-infrared ray-shielding paint of the present invention and comprises a near-infrared ray-shielding layer bonded to at least one surface of the substrate material. The near-infrared ray-shielding laminate of the present invention may comprise only the substrate material and the near-infrared ray-shielding layer, or in addition to the substrate material and the near-infrared ray-shielding layer, other additional layer (for example, ultraviolet ray-shielding layer) may be formed. This additional layer may be disposed on the outer side of the near-infrared ray-shielding layer or between the near-infrared ray-shielding layer and the substrate material or may be disposed on the back surface side (on the side opposite the surface where the near-infrared ray-shielding layer is disposed) of the substrate material.

In the near-infrared ray-shielding laminate of the present invention, various materials such as plastic plate, plastic film and glass may be used as the substrate material, but a transparent plastic is preferably used for the substrate material. In particular, the near-infrared ray-shielding layer is preferably formed on a transparent plastic film, more preferably on a transparent polyester-based resin film. The transparent polyester-based resin film is excellent in view of solvent resistance, cost, productivity and the like and is used as a superior substrate material particularly in the case of forming the near-infrared ray-shielding layer by coating to produce the near-infrared ray-shielding laminate of the present invention.

In the near-infrared ray-shielding laminate of the present invention, when the polyester-based resin film is used as the substrate material, an adhesion-enhancing layer comprising an organic resin component is preferably formed on the film so as to enhance the practical adhesion to the near-infrared ray-shielding layer. In the case of not forming an adhesion-enhancing layer, the near-infrared ray-shielding layer is sometimes readily separated at the interface between the polyester-based resin film and the near-infrared ray-shielding layer.

The adhesion-enhancing layer usable in the present invention mainly comprises an organic resin component but for preventing the change in chromaticity during use of the near-infrared ray-shielding laminate, preferably contains no reactive curing agent.

The organic resin component in the adhesion-enhancing layer is not particularly limited as long as a sufficiently high adhesion, in practice, can be obtained between the near-infrared ray-shielding layer and the polyester-based resin film, and, for example, an acrylic resin, an acryl-melanin copolymer resin, an acryl-polyester copolymer and a polyester-based resin may be used as a simple substance or as a mixture of two or more thereof. Also, in order to enhance the take-up property of the film in the coating step and prevent generation of blocking and scratching, fine particles such as fine silica particles or talc may be appropriately incorporated into the adhesion-enhancing layer.

In the case where a reactive curing agent such as isocyanate compound and block isocyanate compound is contained in the adhesion-enhancing layer, the diimmonium-based compound for the first near-infrared ray-absorption coloring matter in the near-infrared ray-shielding layer readily undergoes alteration by reacting with the reactive curing agent upon exposure to a high temperature of 80° C. or more for a long time and this may cause great change in the chromaticity of the near-infrared ray-shielding layer and/or reduction in the near-infrared ray-shielding property, giving rise to adverse effect on the long-term heat resistance.

The near-infrared ray-shielding laminate of the present invention preferably has a visible transmittance of 60% or more at all wavelengths of 450 nm, 550 nm and 620 nm and at the same time, has an average near-infrared ray transmittance of 10% or less at a wavelength of 850 to 1,000 nm. When the visible transmittance is 60% or more at all wavelengths of 450 nm, 550 nm and 620 nm and the average near-infrared ray transmittance at a wavelength of 850 to 1,000 nm is 10% or less, in using the laminate of the present invention for various displays such as plasma display, excellent near-infrared ray-shielding property and high visibility are exerted.

Furthermore, in the near-infrared ray-shielding laminate of the present invention, the visible light transmittance at a wavelength of 590 nm is preferably 10% or more lower than the visible light transmittance at each wavelength of 450 nm, 525 nm and 620 nm. By virtue of such a construction, the display such as plasma display fabricated by using the near-infrared ray-shielding laminate of the present invention can be enhanced in its contrast property and color tone correcting function. In order to design the near-infrared ray-shielding laminate of the present invention such that the visible light transmittance at a wavelength of 590 nm is 10% or more lower than the visible light transmittance at each wavelength of 450 nm, 525 nm and 620 nm, a selective absorption color material is preferably incorporated into the near-infrared ray-shielding layer. The color material capable of selectively absorbing visible light at a wavelength of 590 nm is not particularly limited as long as it does not adversely affect the alteration of the diimmonium compound in view of composition, but, for example, a quinacridone pigment, an azomethine-based compound, a cyanine-based compound and a porphyrin compound are preferably used.

In a preferred embodiment of the near-infrared ray-shielding laminate, the substrate material has an ultraviolet ray-shielding property and/or an ultraviolet ray-shielding layer is formed on the near-infrared ray-shielding layer, and the entire ultraviolet ray transmittance in the ultraviolet region of 380 nm or less is 2% or less. In the case of using the near-infrared ray-shielding laminate of the present invention, for example, as an optical filter for a plasma display or as a near-infrared ray-shielding filter of an optical product, this is generally laminated and bonded to a transparent hard substrate plate such as glass plate and transparent hard resin substrate plate. Therefore, it is preferred to employ any one means out of a method of imparting an ultraviolet ray-shielding function to the adhesion layer comprising a transparent viscous composition or transparent adhesive composition and in the case of using a transparent hard resin substrate plate as the substrate material, a method of imparting an ultraviolet ray-shielding function to the substrate plate itself, and a method of imparting an ultraviolet ray-shielding function to the polyester-based resin film substrate material itself on which the near-infrared ray-shielding layer is coated.

The ultraviolet ray-shielding ability which should be imparted to the near-infrared ray-shielding laminate of the present invention for shielding an ultraviolet ray is preferably such that the ultraviolet ray transmittance in the ultraviolet region at a wavelength of 380 nm or less is 2% or less. If the ultraviolet ray transmittance in the ultraviolet region at a wavelength of 380 nm or less exceeds 2%, the near-infrared ray-absorption coloring matter contained in the near-infrared ray-shielding layer may not be satisfactorily prevented from color fading deterioration due to an ultraviolet ray. The ultraviolet ray transmittance in the ultraviolet region at a wavelength of 380 nm or less is more preferably 1% or less.

In the case of further providing an ultraviolet ray-shielding layer, the ultraviolet ray-shielding layer is preferably disposed so that light from the outside can enter the near-infrared ray-shielding layer through the ultraviolet ray-shielding layer.

When the near-infrared ray-shielding laminate of the present invention is subjected to an accelerated deterioration test in a high-humidity atmosphere at a temperature of 60° C. and a relative humidity of 90% for 1,000 hours, an accelerated deterioration test in a high-temperature dry atmosphere at a temperature of 80° C. and a relative humidity of 5% or less for 1,000 hours, an accelerated deterioration test in a high-temperature high-humidity atmosphere at a temperature of 80° C. and a relative humidity of 95% for 48 hours, and an accelerated deterioration weather resistance test for 48 hours under irradiation of a xenon lamp at a radiation intensity of 550 W/m$^2$, the variation of the chromaticity x and y of the near-infrared ray-shielding laminate between before and after the test is preferably 0.005 or less, more preferably from 0 to 0.003, in each test. By virtue of having such a property, when the laminate of the present invention is used for various displays such as a plasma display, the properties such as near-infrared ray-shielding property, visible light transparency and color tone can be maintained over a long period of time without causing deterioration due to temperature change, moisture and light irradiation from the outside, and a stable image can be displayed for a long time.

The paint for the formation of a near-infrared ray-shielding layer of the present invention can be obtained by dissolving or dispersing the first near-infrared ray-absorption coloring matter, the second near-infrared ray-absorption coloring matter and the transparent resin in a solvent according to a conventionally known method.

The solvent is not particularly limited as long as it can satisfactorily dissolve the first near-infrared ray-absorption coloring matter and the second near-infrared ray-absorption coloring matter and has good affinity for the transparent resin, but suitable examples thereof include a ketone-based solvent (e.g., acetone, methyl ethyl ketone, methyl isobutyl ketone, cyclohexanone), toluene, ethyl acetate and butyl acetate. These solvents are appropriately used as a sole solvent or a mixed solvent.

As for the diimmonium-based compound having a counter anion represented by chemical formula (1), which is used in the first near-infrared ray-absorption coloring matter for use in the present invention, the amount added thereof to the near-infrared ray-shielding layer varies depending on the thickness of the near-infrared ray-shielding layer but, in order to bring out a sufficiently high near-infrared ray-shielding property in practice, is preferably controlled such that the average near-infrared ray transmittance in the near-infrared region at a wavelength of 900 to 1,000 nm becomes from 2 to 10%. For this purpose, when the thickness of the near-infrared ray-shielding layer is designed to be approximately from 5 to 50 μm, the blending amount of the diimmonium-based compound is preferably controlled to be approximately from 0.5 to 5.0 parts by weight per 100 parts by weight of the transparent resin. If the average near-infrared ray transmittance in the near-infrared region at a wavelength of 900 to 1,000 nm is less than 2%, the variation of chromaticity x and y between before and after each test of a test in an atmosphere at a temperature of 80° C. and a relative humidity of 95% and a xenon accelerated weather resistance test for 48 hours tends to be excessively large, whereas if the average near-infrared ray transmittance in the near-infrared region at a wavelength of 900 to 1,000 nm exceeds 10%, the near-infrared ray-shielding function may be insufficient in practice. Also, if the blending amount of the diimmonium-based compound is less than 0.5 parts by weight, the average near-infrared ray transmittance in the near-infrared region at a wavelength of 900 to 1,000 nm can be hardly made to be 10% or less, whereas if it exceeds 5.0 parts by weight, segregation of the diimmonium-based compound may occur in the near-infrared ray-shielding layer or the near-infrared ray-shielding layer may have insufficient visible light transparency.

The diimmonium-based compound having a counter anion represented by chemical formula (1) is preferably a diimmonium-based compound represented by chemical formula (3).

The production method of the near-infrared ray-shielding laminate of the present invention comprises coating the near-infrared ray-shielding pint of the present invention on at least one surface of a substrate material, and drying the coating to form a near-infrared ray-shielding layer.

If desired, the production method may comprise forming another additional layer (for example, an ultraviolet ray-shielding layer) on the outer side of the near-infrared ray-shielding layer, on the back surface side of the substrate material, or between the near-infrared ray-shielding layer and the substrate material.

In the production method of the present invention, a method of coating the near-infrared ray-shielding paint on a substrate material by using a normal coating apparatus such as bar coater, gravure reverse coater and slit die coater, and then drying and evaporating the solvent, can be suitably used as the method for forming the near-infrared ray-shielding layer.

EXAMPLES

The present invention will be further illustrated in detail by referring to the following Examples.

The optical properties of the near-infrared ray-shielding laminate used in each of Examples and Comparative Examples were measured by the following methods.

(1) Measurement of Spectral Transmittance

The transmittance at wavelengths of 380 nm, 450 nm, 525 nm, 590 nm, 620 nm, 850 nm, 900 nm, 950 nm and 1,000 nm of each sample was measured by using a spectrophotometer V-570 manufactured by JASCO Corporation, where the transmittance of air in the room was used as the control for comparison. Incidentally, the transmittance at a wavelength of 380 nm was a measured value of only the ultraviolet ray-shielding layer.

(2) Measurement of Chromaticity

The chromaticity x and y was measured with a C light source as the standard light and a 2-degree visual field by using a color analyzer TOPSCAN TC-1800-MkII manufactured by Tokyo Denshoku Co., Ltd.

The conditions of each durability test performed in Examples and Comparative Examples were as follows.

(3) High-Temperature High-Humidity Test 1

Each sample was placed in a thermo-hygrostat tester set to 60° C.-relative humidity 90%, and tested for 1,000 hours.

(4) High-Temperature High-Humidity Test 2

Each sample was placed in a thermo-hygrostat tester set to 80° C.-relative humidity 95%, and tested for 48 hours.

(5) Heat Resistance Test

Each sample was placed in a thermostat set to 80° C. and tested for 1,000 hours.

(6) Weather Resistance Test

Using a xenon accelerated weather resistance tester SUNTEST CPS+ manufactured by Heraeus K.K., the black body surface temperature in the tester was set to 63° C., and the test was performed for 48 hours with an irradiation dose of 550 $W/m^2$ under rainless conditions.

Incidentally, the irradiation of light in the test was applied from the ultraviolet ray-shielding layer side of each sample.

Example 1

(Preparation of Near Infrared Ray-Shielding Composition)

2 Parts by weight of N,N,N',N'-tetrakis(p-dibutylaminophenyl)-p-phenylenediamine-bis(bis(trifluoromethanesulfonyl)imidate) immonium salt (CIR-1085, trademark, produced by Japan Carlit Co., Ltd.) as the diimmonium-based compound having a counter anion represented by formula (1) for the first near-infrared ray-absorption coloring matter, 1 part by weight of a phthalocyanine-based coloring matter (EXCOLOR IR-10A, trade mark, produced by Nippon Shokubai Co., Ltd.; the ratios of the absorption coefficient at an absorption maximum wavelength of 855 nm to the absorption coefficients at wavelengths of 450 nm, 550 nm and 620 nm are 10.2, 8.3 and 9.1, respectively) as the second near-infrared ray-absorption coloring matter, and 50 parts by mass of a 30 mass % solution (resin solid content: 30 mass %, toluene: 40 mass %, ethyl acetate: 30 mass %) of a transparent resin (glass transition point: 90° C., number average molecular weight: 40,000, weight average molecular weight: 330,000) obtained by polymerizing a monomer component containing 50 weight of the monomer of formula (2) where X represents an isobornyl group, were dissolved and mixed in a mixed solvent of methyl ethyl ketone and toluene (mass ratio: 80:20) to prepare a resin composition as the near-infrared ray-shielding paint.

(Coating of Near Infrared Ray-Shielding Layer)

On a polyester-resin film (O-300E100 (ILC36), trademark, produced by Mitsubishi Polyester Film GmbH) having formed thereon an adhesion-enhancing layer containing no reactive curing agent, the near-infrared ray-shielding paint prepared above was coated to have a dry film thickness of 10 μm. Subsequently, the solvent was evaporated in a hot air drying furnace to form a near-infrared ray-shielding layer.

(Production of Near Infrared Ray-Shielding Laminate)

An acrylic transparent pressure-sensitive adhesive layer (dry film thickness: 25 μm) comprising 3 parts by mass of an ultraviolet absorbent (TINUVIN-384, trademark, produced by Ciba Specialty Chemicals Corp.), 1 part by weight of an antioxidant (IRGANOX-1010, trademark, produced by the same company) and 96 parts by mass of an acrylic pressure-sensitive adhesive (Oribain BPS5448, trademark, produced by Toyo Ink Mfg. Co., Ltd.) was formed on a 2 mm-thick soda lime glass substrate plate, and the non-coated surface of the above-described polyester-based resin film having formed thereon a near-infrared ray-shielding layer was laminated on the pressure-sensitive adhesive layer to produce a near-infrared ray-shielding laminate. The ultraviolet ray transmittance of the acrylic transparent pressure-sensitive adhesive layer at a wavelength of 380 nm was 1%.

The optical properties of this near-infrared ray-shielding laminate were measured at the initial stage and after each test, and the results obtained are shown in Table 1.

Example 2

A near-infrared ray-shielding laminate was produced in the same manner as in Example 1 except that 0.2 parts by mass of a color material (TY171, trademark, produced by Asahi Denka Co., Ltd.) capable of selectively absorbing visible light at a wavelength of 590 nm was additionally blended in the near-infrared ray-shielding composition of Example 1. The optical properties of the obtained near-infrared ray-shielding laminate were measured at the initial stage and after each test, and the results obtained are shown in Table 1.

Comparative Example 1

A near-infrared ray-shielding laminate was produced in the same manner as in Example 1 except that 2 parts by weight of N,N,N',N'-tetrakis(p-dibutylaminophenyl)-p-phenylenediamine-bis(hexafluoroantimonate) immonium salt (CIR-1081, trademark, produced by Japan Carlit Co., Ltd.) was used as the diimmonium-based compound for the first near-infrared ray-absorption coloring matter. The initial optical properties of the obtained near-infrared ray-shielding laminate are shown in Table 1.

Comparative Example 2

A near-infrared ray-shielding laminate was produced in the same manner as in Example 1 except that 1 part by weight of EXCOLOR IR-1, trade mark, produced by Nippon Shokubai Co., Ltd. (the ratios of the absorption coefficient at an absorption maximum wavelength of 806 nm to the absorption coefficients at wavelengths of 450 nm, 550 nm and 620 nm were 12.3, 4.7 and 4.9, respectively) was used as the second near-infrared ray-absorption coloring matter blended in the near-infrared ray-shielding composition. This second near-infrared ray-absorption coloring matter is a coloring matter having substantial absorption in the visible wavelength region.

The initial optical properties of the obtained near-infrared ray-shielding laminate are shown in Table 1.

Comparative Example 3

A near-infrared ray-shielding laminate was produced in the same manner as in Example 1 except that 15 parts by mass of a butyl methacrylate resin (glass transition point: 103° C., number average molecular weight: 80,000) was used as the transparent resin blended in the near-infrared ray-shielding composition.

The optical properties of the obtained near-infrared ray-shielding laminate were measured at the initial stage and after each test, and the results obtained are shown in Table 1.

Comparative Example 4

A near-infrared ray-shielding laminate was produced in the same manner as in Example 1 except that 15 parts by mass of a polycarbonate resin (glass transition point: 150° C., number average molecular weight: 63,000) was used as the transparent resin blended in the near-infrared ray-shielding composition and dichloromethane was used as the solvent in place of the mixed solvent of methyl ethyl ketone and toluene.

The optical properties of the obtained near-infrared ray-shielding laminate were measured at the initial stage and after each test, and the results obtained are shown in Table 1.

TABLE 1

[High-Temperature High-Humidity Test 1]

| | Example 1 | | | Example 2 | | |
|---|---|---|---|---|---|---|
| Item | Initial Stage | After Test | Variation | Initial Stage | After Test | Variation |
| Transmittance % | | | | | | |
| 380 nm | 1 | 1 | 0 | 1 | 1 | 0 |
| 450 nm | 69 | 68 | −1 | 69 | 68 | −1 |
| 525 nm | 73 | 73 | 0 | 69 | 69 | 0 |
| 590 nm | 74 | 74 | 0 | 30 | 30 | 0 |
| 620 nm | 75 | 75 | 0 | 70 | 70 | 0 |
| 850 nm | 9 | 9 | 0 | 9 | 9 | 0 |
| 900 nm | 7 | 7 | 0 | 7 | 7 | 0 |
| 950 nm | 5 | 5 | 0 | 5 | 5 | 0 |
| 1000 nm | 4 | 4 | 0 | 4 | 4 | 0 |
| Chromaticity | | | | | | |
| x | 0.315 | 0.317 | 0.002 | 0.284 | 0.286 | 0.002 |
| y | 0.326 | 0.329 | 0.003 | 0.300 | 0.303 | 0.003 |

TABLE 2

[High-Temperature High-Humidity Test 2]

| | Example 1 | | | Example 2 | | |
|---|---|---|---|---|---|---|
| Item | Initial Stage | After Test | Variation | Initial Stage | After Test | Variation |
| Transmittance % | | | | | | |
| 380 nm | 1 | 1 | 0 | 1 | 1 | 0 |
| 450 nm | 69 | 68 | −1 | 69 | 68 | −1 |
| 525 nm | 73 | 73 | 0 | 69 | 69 | 0 |
| 590 nm | 74 | 74 | 0 | 30 | 30 | 0 |
| 620 nm | 75 | 75 | 0 | 70 | 70 | 0 |
| 850 nm | 9 | 9 | 0 | 9 | 9 | 0 |
| 900 nm | 7 | 8 | 1 | 7 | 8 | 1 |
| 950 nm | 5 | 6 | 1 | 5 | 6 | 1 |
| 1000 nm | 4 | 5 | 1 | 4 | 5 | 1 |
| chromaticity | | | | | | |
| x | 0.315 | 0.318 | 0.003 | 0.284 | 0.287 | 0.003 |
| y | 0.326 | 0.330 | 0.004 | 0.300 | 0.304 | 0.004 |

TABLE 3

[Heat Resistance Test]

| | Example 1 | | | Example 2 | | |
|---|---|---|---|---|---|---|
| Item | Initial Stage | After Test | Variation | Initial Stage | After Test | Variation |
| | Transmittance % | | | | | |
| 380 nm | 1 | 1 | 0 | 1 | 1 | 0 |
| 450 nm | 69 | 68 | −1 | 69 | 68 | −1 |
| 525 nm | 73 | 73 | 0 | 69 | 69 | 0 |
| 590 nm | 74 | 74 | 0 | 30 | 30 | 0 |
| 620 nm | 75 | 75 | 0 | 70 | 70 | 0 |
| 850 nm | 9 | 9 | 0 | 9 | 9 | 0 |
| 900 nm | 7 | 8 | 1 | 7 | 8 | 1 |
| 950 nm | 5 | 6 | 1 | 5 | 6 | 1 |
| 1000 nm | 4 | 5 | 1 | 4 | 5 | 1 |
| | Chromaticity | | | | | |
| x | 0.315 | 0.317 | 0.002 | 0.284 | 0.286 | 0.002 |
| y | 0.326 | 0.329 | 0.003 | 0.300 | 0.303 | 0.003 |

TABLE 4

[Light Fastness Test]

| | Example 1 | | | Example 2 | | |
|---|---|---|---|---|---|---|
| Item | Initial Stage | After Test | Variation | Initial Stage | After Test | Variation |
| | Transmittance % | | | | | |
| 380 nm | 1 | 1 | 0 | 1 | 1 | 0 |
| 450 nm | 69 | 68 | −1 | 69 | 68 | −1 |
| 525 nm | 73 | 73 | 0 | 69 | 69 | 0 |
| 590 nm | 74 | 74 | 0 | 30 | 30 | 0 |
| 620 nm | 75 | 75 | 0 | 70 | 70 | 0 |
| 850 nm | 9 | 9 | 0 | 9 | 9 | 0 |
| 900 nm | 7 | 8 | 1 | 7 | 8 | 1 |
| 950 nm | 5 | 6 | 1 | 5 | 6 | 1 |
| 1000 nm | 4 | 5 | 1 | 4 | 5 | 1 |
| | Chromaticity | | | | | |
| x | 0.315 | 0.317 | 0.002 | 0.315 | 0.317 | 0.002 |
| y | 0.326 | 0.330 | 0.004 | 0.326 | 0.330 | 0.004 |

TABLE 5

[High-Temperature High-Humidity Test 1]

| | Comparative Example 1 | | | Comparative Example 2 | | | Comparative Example 3 | | | Comparative Example 4 | | |
|---|---|---|---|---|---|---|---|---|---|---|---|---|
| Item | Initial Stage | After Test | Variation | Initial Stage | After Test | Variation | Initial Stage | After Test | Variation | Initial Stage | After Test | Variation |
| | Transmittance % | | | | | | | | | | | |
| 380 nm | 1 | 1 | 0 | 1 | — | — | 1 | 1 | 0 | 1 | 1 | 0 |
| 450 nm | 69 | 68 | −1 | 60 | — | — | 69 | 67 | −2 | 69 | 69 | 0 |
| 525 nm | 73 | 73 | 0 | 49 | — | — | 73 | 73 | 0 | 73 | 73 | 0 |
| 590 nm | 74 | 74 | 0 | 50 | — | — | 74 | 74 | 0 | 74 | 74 | 0 |
| 620 nm | 75 | 75 | 0 | 51 | — | — | 75 | 75 | 0 | 75 | 75 | 0 |
| 850 nm | 9 | 9 | 0 | 17 | — | — | 9 | 12 | 3 | 9 | 9 | 0 |
| 900 nm | 7 | 7 | 0 | 18 | — | — | 7 | 10 | 3 | 7 | 7 | 0 |
| 950 nm | 5 | 5 | 0 | 10 | — | — | 5 | 9 | 4 | 5 | 5 | 0 |
| 1000 nm | 4 | 4 | 0 | 3 | — | — | 4 | 9 | 5 | 4 | 4 | 0 |
| | Chromaticity | | | | | | | | | | | |
| x | 0.315 | 0.317 | 0.002 | 0.299 | — | — | 0.315 | 0.318 | 0.003 | 0.315 | 0.316 | 0.001 |
| y | 0.326 | 0.329 | 0.003 | 0.294 | — | — | 0.326 | 0.332 | 0.006 | 0.326 | 0.327 | 0.001 |

TABLE 6

[High-Temperature High-Humidity Test 2]

| | Comparative Example 1 | | | Comparative Example 2 | | | Comparative Example 3 | | | Comparative Example 4 | | |
|---|---|---|---|---|---|---|---|---|---|---|---|---|
| Item | Initial Stage | After Test | Variation | Initial Stage | After Test | Variation | Initial Stage | After Test | Variation | Initial Stage | After Test | Variation |
| | Transmittance % | | | | | | | | | | | |
| 380 nm | 1 | 1 | 0 | — | — | — | 1 | 1 | 0 | 1 | 1 | 0 |
| 450 nm | 69 | 68 | −1 | — | — | — | 69 | 67 | −2 | 69 | 69 | 0 |

TABLE 6-continued

[High-Temperature High-Humidity Test 21]

| | Comparative Example 1 | | | Comparative Example 2 | | | Comparative Example 3 | | | Comparative Example 4 | | |
|---|---|---|---|---|---|---|---|---|---|---|---|---|
| Item | Initial Stage | After Test | Variation | Initial Stage | After Test | Variation | Initial Stage | After Test | Variation | Initial Stage | After Test | Variation |
| 525 nm | 73 | 73 | 0 | — | — | — | 73 | 73 | 0 | 73 | 73 | 0 |
| 590 nm | 74 | 74 | 0 | — | — | — | 74 | 74 | 0 | 74 | 74 | 0 |
| 620 nm | 75 | 75 | 0 | — | — | — | 75 | 75 | 0 | 75 | 75 | 0 |
| 850 nm | 9 | 9 | 0 | — | — | — | 9 | 10 | 1 | 9 | 9 | 0 |
| 900 nm | 7 | 8 | 1 | — | — | — | 7 | 8 | 1 | 7 | 7 | 0 |
| 950 nm | 5 | 6 | 1 | — | — | — | 5 | 6 | 1 | 5 | 5 | 0 |
| 1000 nm | 4 | 5 | 1 | — | — | — | 4 | 6 | 2 | 4 | 4 | 0 |
| Chromaticity | | | | | | | | | | | | |
| x | 0.315 | 0.319 | 0.004 | — | — | — | 0.315 | 0.319 | 0.004 | 0.315 | 0.316 | 0.001 |
| y | 0.326 | 0.334 | 0.008 | — | — | — | 0.326 | 0.335 | 0.009 | 0.326 | 0.327 | 0.001 |

TABLE 7

[Heat Resistance Test]

| | Comparative Example 1 | | | Comparative Example 2 | | | Comparative Example 3 | | | Comparative Example 4 | | |
|---|---|---|---|---|---|---|---|---|---|---|---|---|
| Item | Initial Stage | After Test | Variation | Initial Stage | After Test | Variation | Initial Stage | After Test | Variation | Initial Stage | After Test | Variation |
| Transmittance % | | | | | | | | | | | | |
| 380 nm | 1 | 1 | 0 | — | — | — | 1 | 1 | 0 | 1 | 1 | 0 |
| 450 nm | 69 | 68 | −1 | — | — | — | 69 | 68 | −1 | 69 | 69 | 0 |
| 525 nm | 73 | 73 | 0 | — | — | — | 73 | 73 | 0 | 73 | 73 | 0 |
| 590 nm | 74 | 74 | 0 | — | — | — | 74 | 74 | 0 | 74 | 74 | 0 |
| 620 nm | 75 | 75 | 0 | — | — | — | 75 | 75 | 0 | 75 | 75 | 0 |
| 850 nm | 9 | 9 | 0 | — | — | — | 9 | 10 | 1 | 9 | 9 | 0 |
| 900 nm | 7 | 8 | 1 | — | — | — | 7 | 8 | 1 | 7 | 7 | 0 |
| 950 nm | 5 | 6 | 1 | — | — | — | 5 | 6 | 1 | 5 | 5 | 0 |
| 1000 nm | 4 | 5 | 1 | — | — | — | 4 | 6 | 2 | 4 | 4 | 0 |
| Chromaticity | | | | | | | | | | | | |
| x | 0.315 | 0.317 | 0.002 | — | — | — | 0.315 | 0.318 | 0.003 | 0.315 | 0.316 | 0.001 |
| y | 0.326 | 0.330 | 0.004 | — | — | — | 0.326 | 0.331 | 0.005 | 0.326 | 0.327 | 0.001 |

TABLE 8

[Light Fastness Test]

| | Comparative Example 1 | | | Comparative Example 2 | | | Comparative Example 3 | | | Comparative Example 4 | | |
|---|---|---|---|---|---|---|---|---|---|---|---|---|
| Item | Initial Stage | After Test | Variation | Initial Stage | After Test | Variation | Initial Stage | After Test | Variation | Initial Stage | After Test | Variation |
| Transmittance % | | | | | | | | | | | | |
| 380 nm | 1 | 1 | 0 | — | — | — | 1 | 1 | 0 | 1 | 1 | 0 |
| 450 nm | 69 | 67 | −2 | — | — | — | 69 | 67 | −2 | 69 | 60 | −9 |
| 525 nm | 73 | 73 | 0 | — | — | — | 73 | 73 | 0 | 73 | 74 | 1 |
| 590 nm | 74 | 74 | 0 | — | — | — | 74 | 74 | 0 | 74 | 74 | 0 |
| 620 nm | 74 | 74 | 0 | — | — | — | 75 | 75 | 0 | 75 | 75 | 0 |
| 850 nm | 9 | 10 | 1 | — | — | — | 9 | 10 | 1 | 9 | 12 | 3 |
| 900 nm | 7 | 8 | 1 | — | — | — | 7 | 8 | 1 | 7 | 12 | 5 |
| 950 nm | 5 | 6 | 1 | — | — | — | 5 | 6 | 1 | 5 | 11 | 6 |
| 1000 nm | 4 | 5 | 1 | — | — | — | 4 | 6 | 2 | 4 | 12 | 8 |
| Chromaticity | | | | | | | | | | | | |
| x | 0.315 | 0.318 | 0.003 | — | — | — | 0.315 | 0.318 | 0.003 | 0.315 | 0.330 | 0.015 |
| y | 0.326 | 0.332 | 0.006 | — | — | — | 0.326 | 0.332 | 0.006 | 0.326 | 0.351 | 0.025 |

Evaluation Results

The near-infrared ray-shielding laminate of Example 1 exhibited initial properties of high transmittance in the visible region and high near-infrared ray-shielding property in the region of 850 to 1,000 nm.

Also, in all test items, the variation of the chromaticity x and y was 0.005 point or less, revealing excellent durability.

The near-infrared ray-shielding laminate of Example 2 exhibited initial properties of selective absorption at 590 nm, high transmittance at 450 nm, 525 nm and 620 nm, and high near-infrared ray-shielding property in the region of 850 to 1,000 nm.

Also, in Examples 1 and 2, the variation of the chromaticity x and y was 0.005 point or less in all test items, revealing excellent durability.

On the other hand, the near-infrared ray-shielding laminate of Comparative Example 1 exhibited initial properties of high transmittance in the visible region and high near-infrared ray-shielding property in the region of 850 to 1,000 nm, but in the high-temperature high-humidity test 2 of 80° C.-relative humidity 95%, the chromaticity was greatly changed and the durability was insufficient.

The near-infrared ray-shielding laminate of Comparative Example 2 exhibited initial properties of low transmittance of 60% or less at each wavelength of 450 nm, 525 nm and 620 nm, despite relatively high near-infrared ray-shielding property in the region of 850 to 1,000 nm, and this reveals that the optical properties are inferior.

The near-infrared ray-shielding laminate of Comparative Example 3 exhibited initial properties of high transmittance in the visible region and high near-infrared ray-shielding property in the region of 850 to 1,000 nm, but the variation of chromaticity between before and after each test was large and, particularly, the chromaticity was greatly changed in the high-temperature high-humidity test, revealing poor durability.

Furthermore, the near-infrared ray-shielding laminate of Comparative Example 4 exhibited initial properties of high transmittance in the visible region and high near-infrared ray-shielding property in the region of 850 to 1,000 nm and exhibited excellent durability in the high-temperature high-humidity test and the heat resistance test, but the variation of the chromaticity between before and after the light fastness test was large, revealing that the durability against outside light is poor.

INDUSTRIAL APPLICABILITY

The present invention has high industrial usefulness by providing a near-infrared ray-shielding point capable of forming a coat layer which can ensure a high transmittance in the visible region, achieve a high shielding effect in the near-infrared region and exhibit high stability in the severe environmental conditions, a laminate having this coat layer, and a production method thereof.

The invention claimed is:

1. A near-infrared ray shielding paint comprising a first near-infrared ray-absorption coloring matter comprising at least one near-infrared ray-absorption diimonium compound constituted from a diimonium compound cation and a counter anion represented by the formula (1):

second near-infrared ray-absorption coloring matter comprising at least one coloring matter compound having a maximum absorption in a near-infrared wavelength range of from 750 to 950 mn, exhibiting substantially no absorption in the visible ray wavelength range and different from the diimonium compound; and a transparent resin comprising a polymer of at least one ethylenically unsaturated monomer;

wherein the ethylenically unsaturated monomer comprises a monomer represented by the general formula (2):

in which general formula (2), R represents a hydrogen atom or a methyl group and X represents a cyclic hydrocarbon group having 6 to 25 carbon atoms, in a content of 30% by mass.

2. The near-infrared ray shielding paint as claimed in claim 1, wherein the near-infrared ray-absorption diimonium compound for the first near-infrared ray-absorption coloring matter comprises a compound represented by the formula (3):

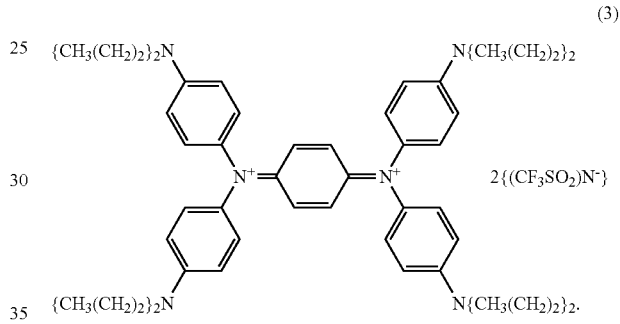

3. The near-infrared ray shielding paint as claimed in claim 1, wherein the second near-infrared ray-absorption coloring matter is selected from dithiol metal complex compounds, phthalocyanine compounds, naphthalocyanine compounds and cyanine compounds each having a maximum absorption in the wavelength range of from 750 to 950 nm and exhibiting substantially no absorption in the visible ray wavelength range.

4. The near-infrared ray shielding paint as claimed in claim 3, wherein the phthalocyanine compound is selected from the compounds represented by the general formula (4):

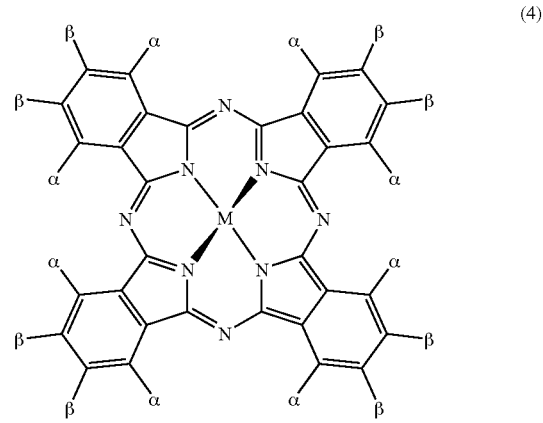

in which general formula (4), the eight αs respectively and independently represents a member selected from —SR$^1$, —OR$^2$ and —NHR$^3$ groups and a halogen atom, except that at least one of the αs must represent the NHR$^3$ group; the eight βs respectively or independently from each other represent a member selected from —SR$^1$ or —OR$^2$ groups and a halogen atom, except that at least one of the βs must represent a —SR$^1$ or —OR$^2$ group; and at least one of the eight αs and at least one of the eight βs respectively represents a halogen atom and an —OR$^2$ group, R$^1$, R$^2$ and R$^3$ respectively and independently from each other represents a member selected from substituted and unsubstituted phenyl groups, alkyl groups having 1 to 20 carbon atoms and aralkyl groups having 7 to 20 carbon atoms, and M represent a member selected from a metal atom, one or more hydrogen atoms, a metal oxide and a metal halide.

5. The near-infrared ray shielding paint as claimed in any one of claims 1 to 4, wherein the ratio in mass of the first near-infrared ray absorption coloring matter to the second near-infrared ray absorption coloring matter contained in the paint is in the range of from 3:2 to 29:1.

6. The near-infrared ray shielding paint as claimed in any one of claims 1, 3, and 4, wherein ratios in absorptivity of the second near-infrared absorption coloring matter at the maximum absorption wavelength in the near-infrared ray wavelength range to absorptivities of the second near-infrared absorption coloring matter at the wavelengths of 450 nm, 550 nm and 620 nm are all 5.0 or more.

7. The near-infrared ray shielding paint as claimed in claim 1, wherein the transparent resin has a glass-transition temperature of 60 to 120° C., a number average molecular weight of 20,000 to 80,000 and a weight average molecular weight of 200,000 to 400,000.

8. The near-infrared ray shielding paint as claimed in any one of claims 1 to 4, wherein a ratio in dry solid mass of the total of the first and second near-infrared ray-absorption coloring matter to the transparent resin is in the range of from 1:99 to 1:4.

9. A near-infrared ray shielding laminate comprising a substrate material and at least one near-infrared ray-shielding layer formed from the barrier paint for shielding the near-infrared rays as claimed in any one of claims 1 to 4, and bonded to at least one surface of the substrate material.

10. The near-infrared ray shielding laminate as claimed in claim 9, wherein the substrate material comprises a polyester resin film and an adhesion-enhancing layer formed on a surface of the polyester resin film but not containing a reactive curing agent, the near-infrared ray-shielding layer being formed on the adhesion-enhancing layer.

11. The near-infrared ray shielding laminate as claimed in claim 9, having a visible ray-transmittance of 60% or more at each wavelength of 450 nm, 525 nm and 620 nm and an average near-infrared ray transmittance of 10% or less at a wavelengths from 850 to 1,000 nm.

12. The near-infrared ray shielding laminate as claimed in claim 9, wherein the visible ray transmittance of the laminate at a wavelength of 590 nm is 10% or more below the visible ray transmittance of the laminate at each wavelength of 450 nm, 525 nm and 620 nm.

13. The near-infrared ray shielding laminate as claimed in claim 9, wherein the substrate material has a ultraviolet ray-shielding property, and/or a ultraviolet ray-shielding layer is further coated on the near-infrared ray-shielding layer, and, as a whole, the barrier laminate exhibits a ultraviolet ray transmittance of 2% or less, in a ultraviolet range having a wavelength of 380 nm or less.

14. The near-infrared ray shielding laminate as claimed in claim 13, wherein the ultraviolet ray shielding layer comprises a transparent solid material and a ultraviolet ray-absorption layer formed on a surface of the transparent solid material and comprising a ultraviolet absorber and a binder.

15. The near-infrared ray shielding laminate as claimed in claim 9, wherein a result of each deterioration promotion test in a high humidity atmosphere at a temperature of 60° C. at a relative humidity of 90% for 1,000 hours; a deterioration promotion test in a high temperature dry atmosphere at a temperature of 80° C. at a relative humidity of 5% or less for 1,000 hours; a deterioration promotion test in a high temperature high humidity atmosphere at a temperature of 80° C. at a relative humidity of 95% for 48 hours; and a deterioration promotion weathering test under a xenon lamp irradiation at an intensity of radiation of 550 W/m$^2$ for 48 hours, the changes in chromaticities x and y of the laminate for shielding near-infrared rays between before and after the each test is 0.005 or less.

16. A method of producing a near-infrared ray shielding laminate comprising coating the barrier paint for infrared rays as claimed in any one of claims 1 to 4 on at least one surface of a substrate material and drying the resultant coating layer to form a near-infrared ray-shielding layer.

* * * * *